(12) United States Patent
Yanagi

(10) Patent No.: US 6,542,561 B1
(45) Date of Patent: Apr. 1, 2003

(54) INFORMATION RECEIVING DEVICE AND METHOD

(75) Inventor: Shigeto Yanagi, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/234,258

(22) Filed: Jan. 20, 1999

(30) Foreign Application Priority Data

Jan. 21, 1998 (JP) .......................................... 10-009202
Jan. 23, 1998 (JP) .......................................... 10-011018

(51) Int. Cl.[7] .......................... H03K 9/00; H04L 27/06; H04L 27/14; H04L 27/22
(52) U.S. Cl. .......................... 375/350; 348/21; 348/607; 348/624
(58) Field of Search ................................. 375/224, 228, 375/144, 316, 340, 346, 348, 350, 354; 348/607, 624, 21; 725/149

(56) References Cited

U.S. PATENT DOCUMENTS

| | | | | |
|---|---|---|---|---|
| 3,758,868 A | * | 9/1973 | Brown ........................ | 327/310 |
| 4,258,324 A | * | 3/1981 | Henrich ...................... | 324/392 |
| 4,920,543 A | * | 4/1990 | Martin ........................ | 375/225 |
| 5,235,612 A | * | 8/1993 | Stilwell et al. .............. | 375/144 |
| 5,428,832 A | * | 6/1995 | Nohara et al. .............. | 455/296 |
| 5,430,894 A | * | 7/1995 | Nohara et al. .............. | 455/296 |
| 5,550,596 A | * | 8/1996 | Strolle et al. ................ | 348/471 |
| 5,577,270 A | * | 11/1996 | Sakai .......................... | 348/736 |
| 5,583,689 A | * | 12/1996 | Cassidy et al. ............. | 359/341 |
| 5,701,328 A | * | 12/1997 | Schuchman et al. ........ | 342/457 |
| 5,799,005 A | * | 8/1998 | Soliman ...................... | 370/335 |
| 5,862,173 A | * | 1/1999 | Dent ........................... | 375/149 |
| 5,894,473 A | * | 4/1999 | Dent ........................... | 370/342 |
| 6,216,266 B1 | * | 4/2001 | Eastman et al. .............. | 725/72 |
| 6,256,302 B1 | * | 7/2001 | Siegle et al. ................ | 370/334 |
| 6,327,709 B1 | * | 12/2001 | Ovadia et al. ............... | 725/124 |

* cited by examiner

Primary Examiner—Amanda T. Le (57) ABSTRACT

The present invention discloses a device and method for eliminating an interfering wave and determining the best orientation for an antenna. A SAW (surface acoustic wave) filter employed in the invention eliminates an interfering wave (a ground analog broadcasting wave) and extracts a video-signal element of a specified channel (a bandwidth of 6 MHz) from an input intermediate-frequency signal so as to output to an A/D converter. The arrangement of the filter, which is a band pass filter having a comb-shaped attenuation characteristic, is such that the first peak of attenuation is made to coincide with the peak of an interfering signal; the A/D converter produces an AGC feedback signal to output to a high-frequency amplifier, an intermediate-frequency amplifier, and an operation unit, respectively; a waveform equalization unit eliminates a ghost image generated due to multi-path interference from the input signal by using an equalizing method such as a learning equalization, a blind equalization, etc., to output to an error correction unit and, also, to output a filter tap coefficient used for the equalization to the operation unit; and, then, the error correction unit corrects an error of the input signal by using a Read-Solomon code and a Trellis code to output to a demultiplexer and, also, to output the error-rate information of the input signal to the operation unit.

8 Claims, 10 Drawing Sheets

INFORMATION RECEIVING DEVICE AND METHOD

BACKGROUND OF THE INVENTION

1. Field of the Invention

The present invention relates to a device and method for receiving information. More particularly, the invention relates to an information receiving device and method in which an attenuation characteristic of a filter is adjusted to an interfering wave, and an information receiving device and method in which a degree of multipath interference in transmitting information via a ground wave is displayed.

2. Description of the Related Art

In TV broadcasting, digital multi-channel broadcasting via satellite (hereinafter referred to as satellite digital broadcasting) has already been in actual use. In the feature, digitization of ground-wave broadcasting (hereinafter referred to as ground digital broadcasting) can be achieved to be expanded.

Figure 9:
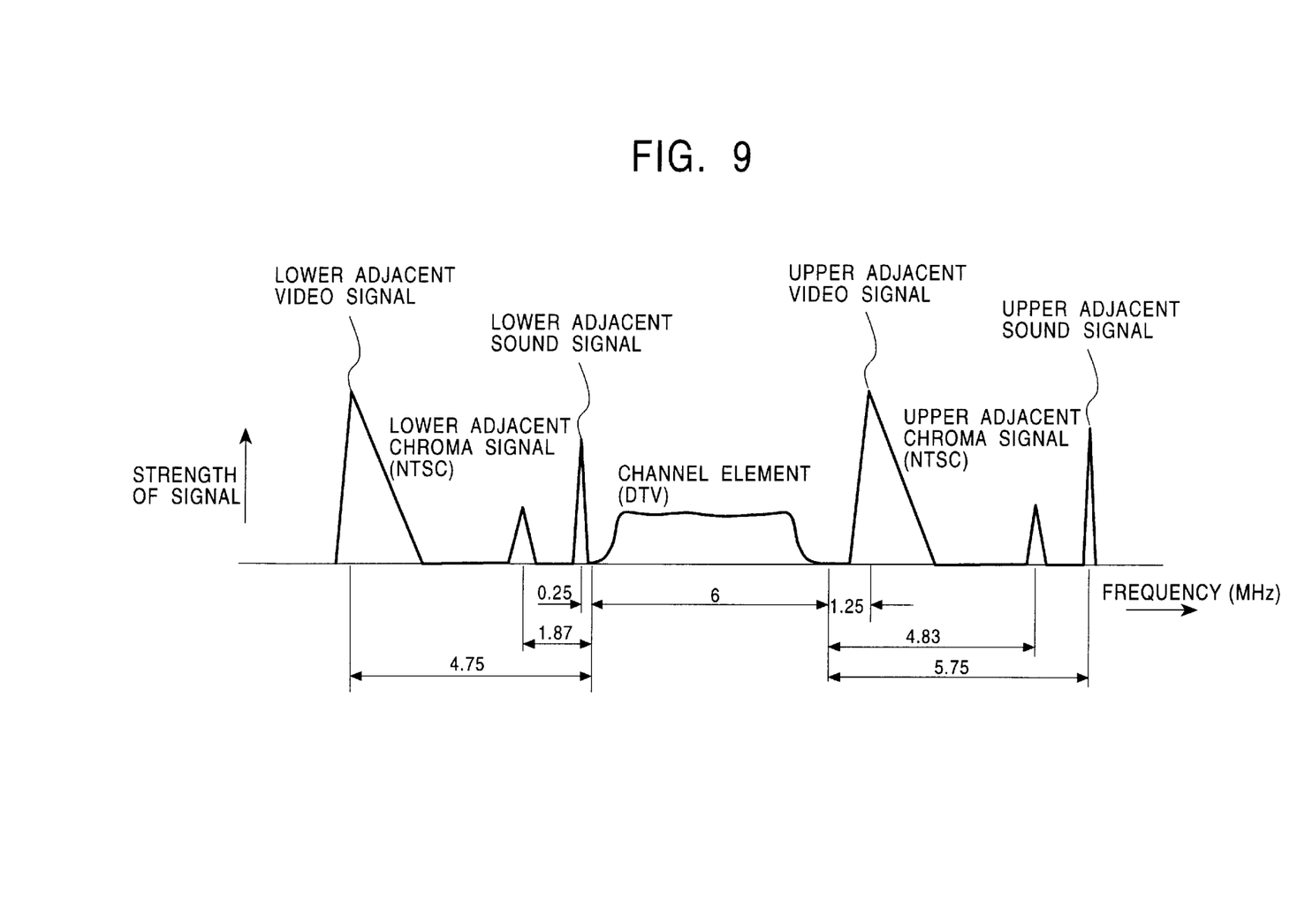
FIG. 9 is an illustration of the spectrum distribution of a digital wave and an analog wave.

However, all conventional ground-wave broadcasting cannot be converted into ground digital broadcasting at one time. There is a certain phase in which ground analog broadcasting and ground digital broadcasting coexist; and in that phase, as shown in FIG. 9, there is a mixed presence of an analog wave used for ground analog broadcasting of the NTSC method (hereinafter referred to as an analog wave) and a digital wave used for ground digital broadcasting (DTV)(hereinafter referred to as a digital wave) on the ground, which is a transmission path. As a result, the analog wave becomes an interfering signal in receiving the digital wave, since the frequency band of the analog wave is adjacent to that of the digital wave and also the analog wave has a larger output power than the digital wave. Particularly, among the analog waves, the lower adjacent sound signal is the biggest obstacle.

Thus, in order to extract a specified channel element of the digital ground wave broadcasting, a filter for eliminating such interfering analog waves is necessary.

Figure 10:
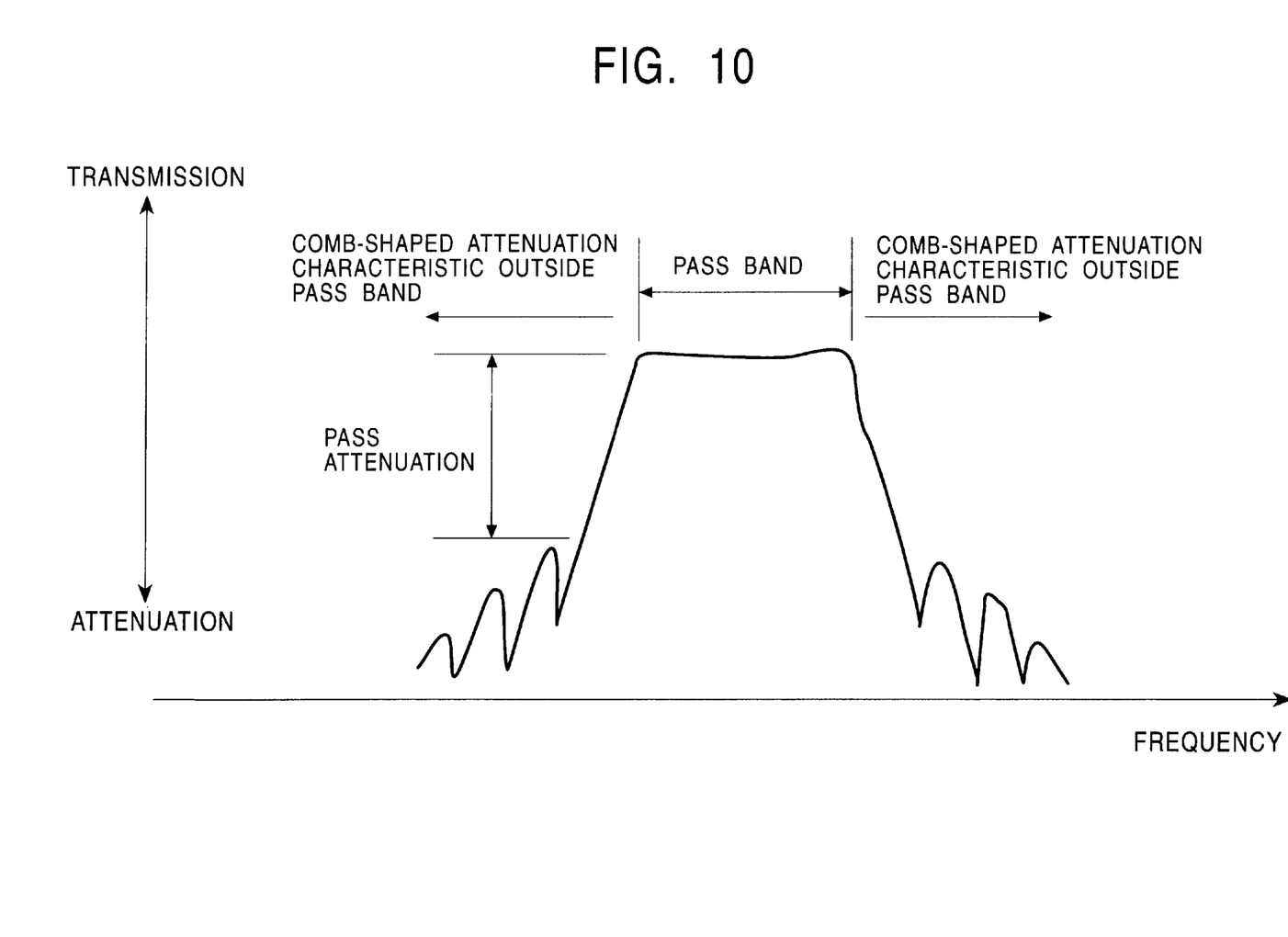
FIG. 10 is an example of an attenuation characteristic of a conventional band pass filter.

It is difficult, however, for a conventional band pass filter to eliminate the lower adjacent sound signal as the biggest problem, since it has a comb-shaped attenuation characteristic, as shown in FIG. 10, and exists adjacent to the channel element to be extracted.

Furthermore, the main obstacles to the transmission of a digital wave on the transmission path for satellite digital broadcasting are weather phenomena such as clouds, rain, or snow, so that the influence from the weather is predictable. To this end, a device for receiving signals is well-equipped for taking countermeasures against these obstacles. In addition, in terms of setting an antenna, the level and C/N (Carrier/Noise) ratio of a signal are checked for arranging it in such a manner that the C/N ratio is a maximum value; and the receiving device has a function for measuring the level and C/N ratio of the signal.

Meanwhile, possible obstacles existing on the transmission path for the ground digital broadcasting are geographic features, buildings, and the like, which cause a big problem to the transmission of a digital wave. In particular, multipath interference is an obstacle which is not present in the satellite digital broadcasting system that transmits information via satellite.

Multipath interference also exists in conventional ground analog broadcasting. A ghost image, which is created by multipath interference, gradually changes corresponding to the orientation of an antenna. Thus, a countermeasure against ghost images is to move the antenna while looking at a picture on the TV set so as to be arranged in an orientation that is least affected by multipath interference.

The influence of multipath interference in ground digital broadcasting, however, is eliminated or corrected by an error-correcting function, which is an advantage in the use of digital signals, even if the antenna is arranged to be deviated slightly from the best orientation. Therefore, it is impossible to use the method for determining a direction in which the least amount of ghost image occurs by looking at the picture on the TV set as in the case of ground analog broadcasting above, so that the determination of the best orientation for the antenna cannot be performed.

SUMMARY OF THE INVENTION

Accordingly, the present invention has been made to solve these problems. It is a first object of the present invention to provide a method for eliminating an interfering wave by coinciding the peak of an attenuation characteristic of a filter with the peak of the interfering wave.

Furthermore, it is a second object of the present invention to provide a method for determining the best orientation for an antenna by visually displaying multipath interference.

According to a first aspect of the present invention, there is provided an information receiving device including a receiving unit for receiving an information signal and an extracting unit for extracting a signal of a specified band from the information signal received by the receiving unit; in which the peak of an attenuation characteristic of the extracting unit coincides with the peak of an interfering signal adjacent to a signal to be extracted.

According to a second aspect of the present invention, there is provided an information receiving method including a receiving step for receiving an information signal and an extracting step for extracting a signal of a specified band from the information signal received by the receiving step; in which the peak of an attenuation characteristic of the extracting step coincides with the peak of an interfering signal adjacent to a signal to be extracted.

According to a third aspect of the present invention, there is a providing medium for providing a computer program, which includes a receiving unit for receiving an information signal, an operating unit for calculating the strength of a multipath element, and a display-controlling unit for controlling a display of the strength of the multipath element calculated by the operating unit.

According to a fourth aspect of the present invention, there is provided an information receiving method which includes a receiving step for receiving an information signal, an operating step for calculating the strength of a multipath element, and a display-controlling step for controlling a display of the strength of the multipath element calculated by the operating step.

Regarding the information receiving device described in the first aspect of the invention, the receiving unit receives an information signal, while the extracting unit extracts a signal of a specified band from the information signal received by the receiving unit.

In the information receiving method described in the second aspect of the invention, the receiving step receives an information signal, while the extracting step extracts a signal in a specified band from the information signal received by the receiving step.

DESCRIPTION OF THE PREFERRED EMBODIMENT

Figure 1:
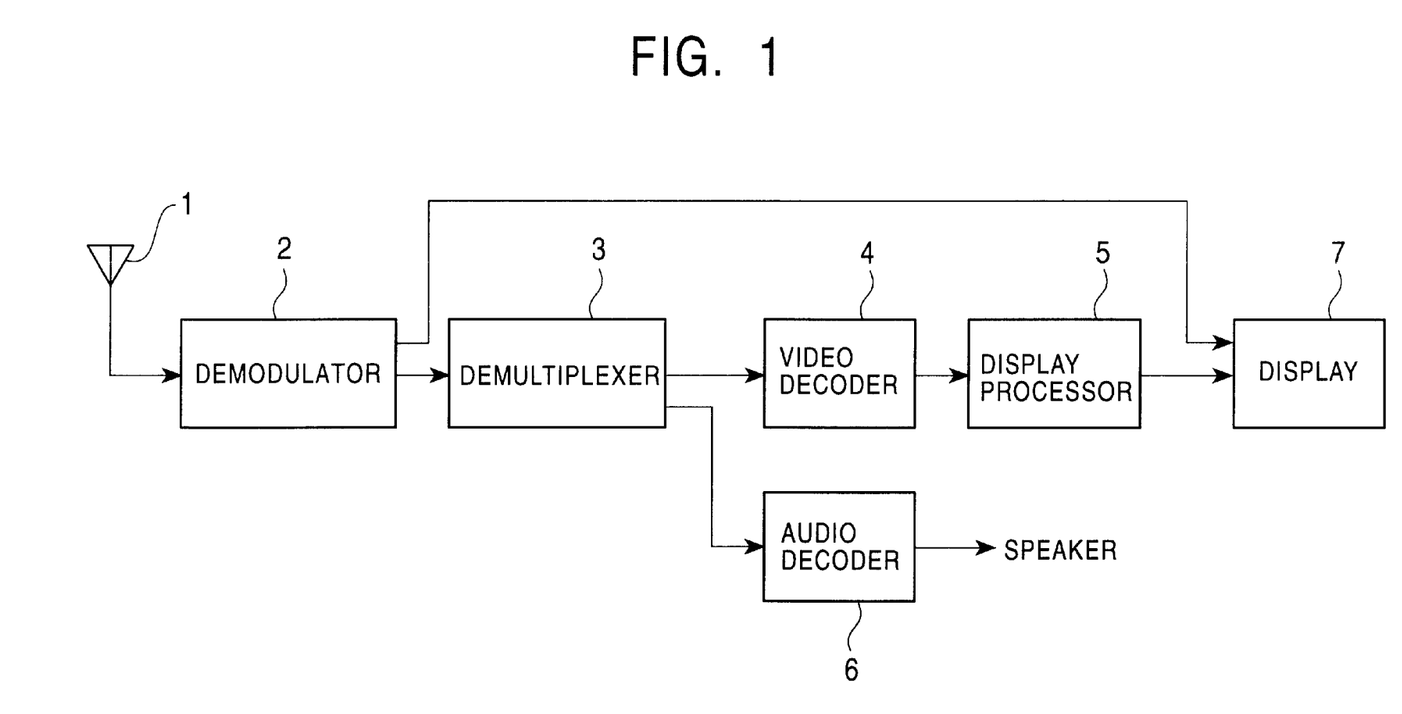
FIG. 1 is a block diagram showing a structure of a receiving device for ground digital broadcasting.

Referring to FIG. 1, a description will be given of an arrangement of a device for receiving a ground digital broadcasting according to the present invention.

An antenna 1 is arranged in such a manner that it receives a signal which is transmitted from a broadcasting station by the Vestigial Sideband (VSB) transmission method as a high-frequency signal (an analog signal) to output to a demodulator 2.

Referring now to FIG. 2, a description will be given of the VSB transmission method.

Figure 2A:
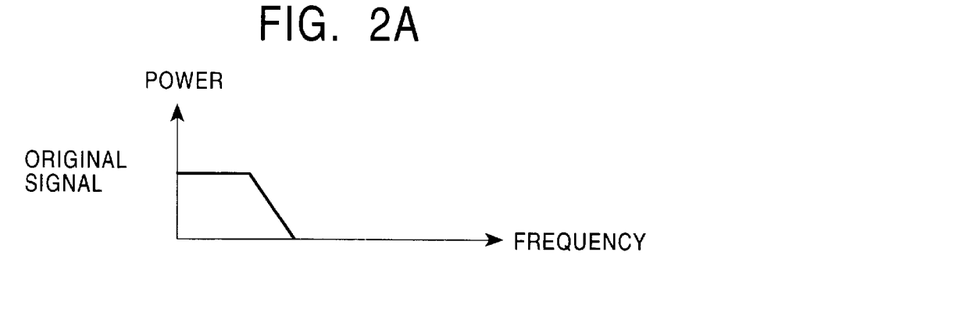
FIG. 2 is a series of graphs in which a VSB (Vestigial Sideband) transmission method is shown.
Figure 2B:
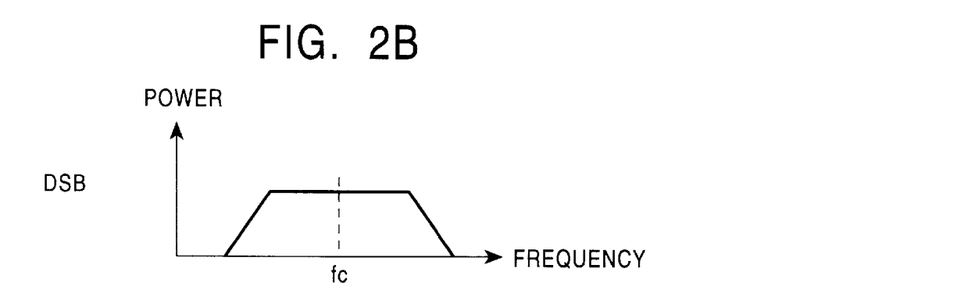
Figure 2C:
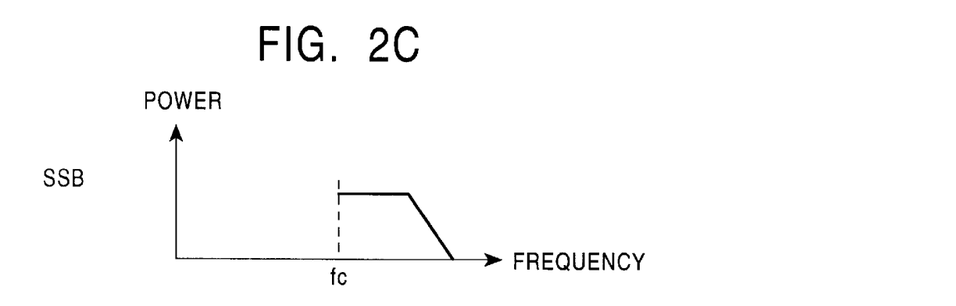
Figure 2D:
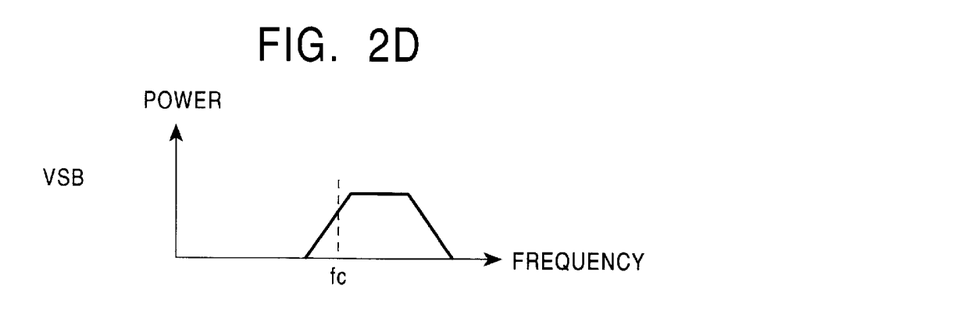

As shown in FIG. 2(B), in a frequency spectrum in which a signal (an original signal) shown in FIG. 2(A) is amplitude-modulated (AM modulation), the spectrum of the original signal is stored in both side bands with respect to a carrier wave frequency ($f_c$) at the center; the method for transmitting the spectrum, as it is, is called Double Sideband (DSB) transmission, while as shown in FIG. 2(C), the method for transmitting either one of the spectra of the upper and lower wave bands is called Single Sideband (SSB) transmission. However, in fact, it is difficult to produce a bandpass filter which can precisely eliminate only one of the spectra of the upper and lower wave bands in the SSB transmission. Accordingly, as shown in FIG. 2(D), the arrangement of the VSB transmission is such that a cut-off frequency characteristic of the filter is moderate and a small amount of the spectrum of a sideband to be eliminated remains to be transmitted.

Figure 3:
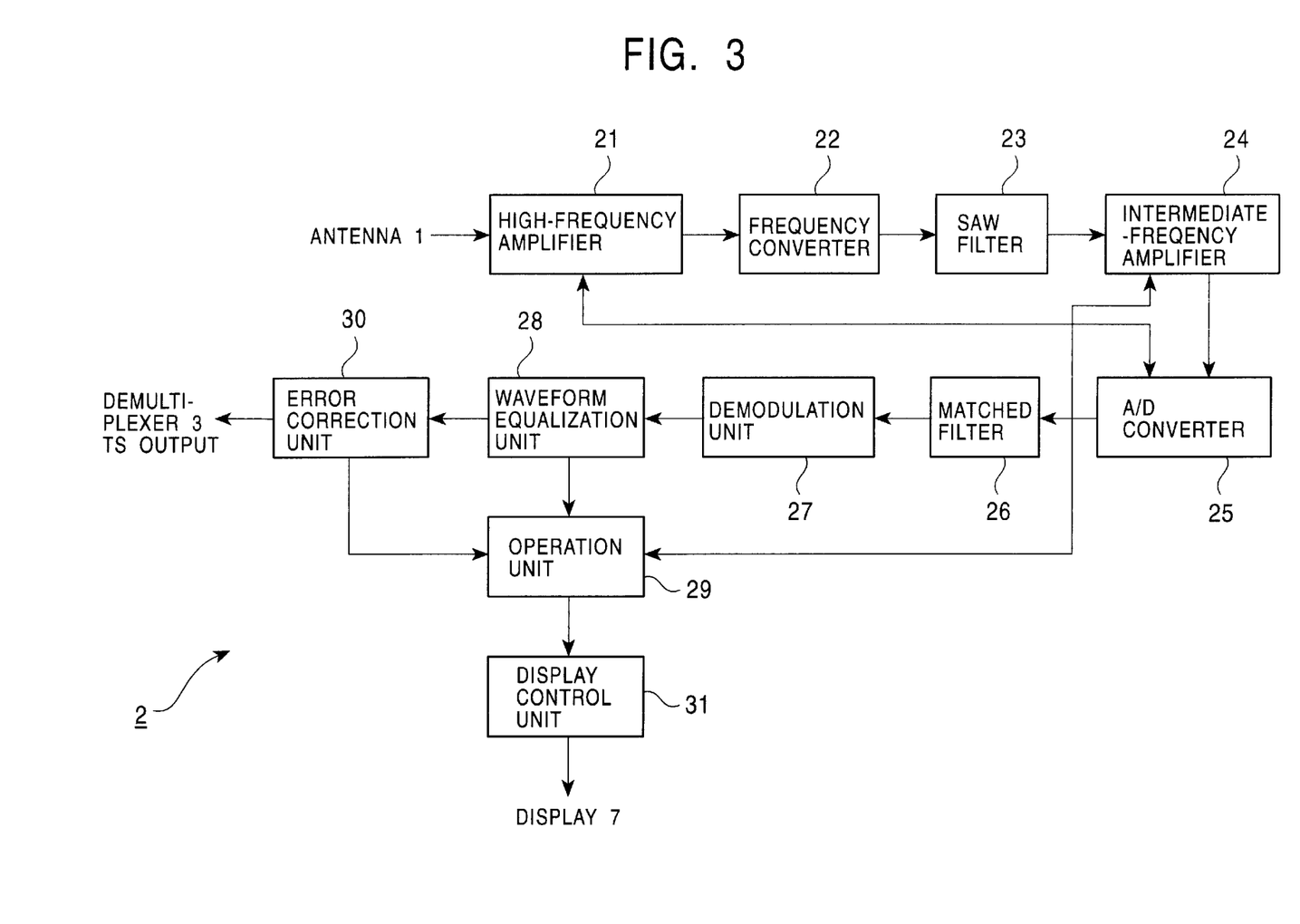
FIG. 3 is a block diagram illustrating a demodulator 2 shown in FIG. 1.

Referring to FIG. 3, a detailed description will be given of a structure of the demodulator 2. A high-frequency amplifier 21 amplifies a high-frequency signal input from an antenna 1 in correspondence with an AGC feedback signal; which is described below, and outputs it to a frequency converter 22, which converts the input high-frequency signal into a signal of an intermediate-frequency (44 MHz) to output to a SAW filter 23.

The SAW filter 23 eliminates an interfering wave (a ground analog broadcasting wave) and extracts a specified channel element (6 MHz of passband) from the input intermediate-frequency signal to output to an intermediate-frequency amplifier 24.

Figure 4:
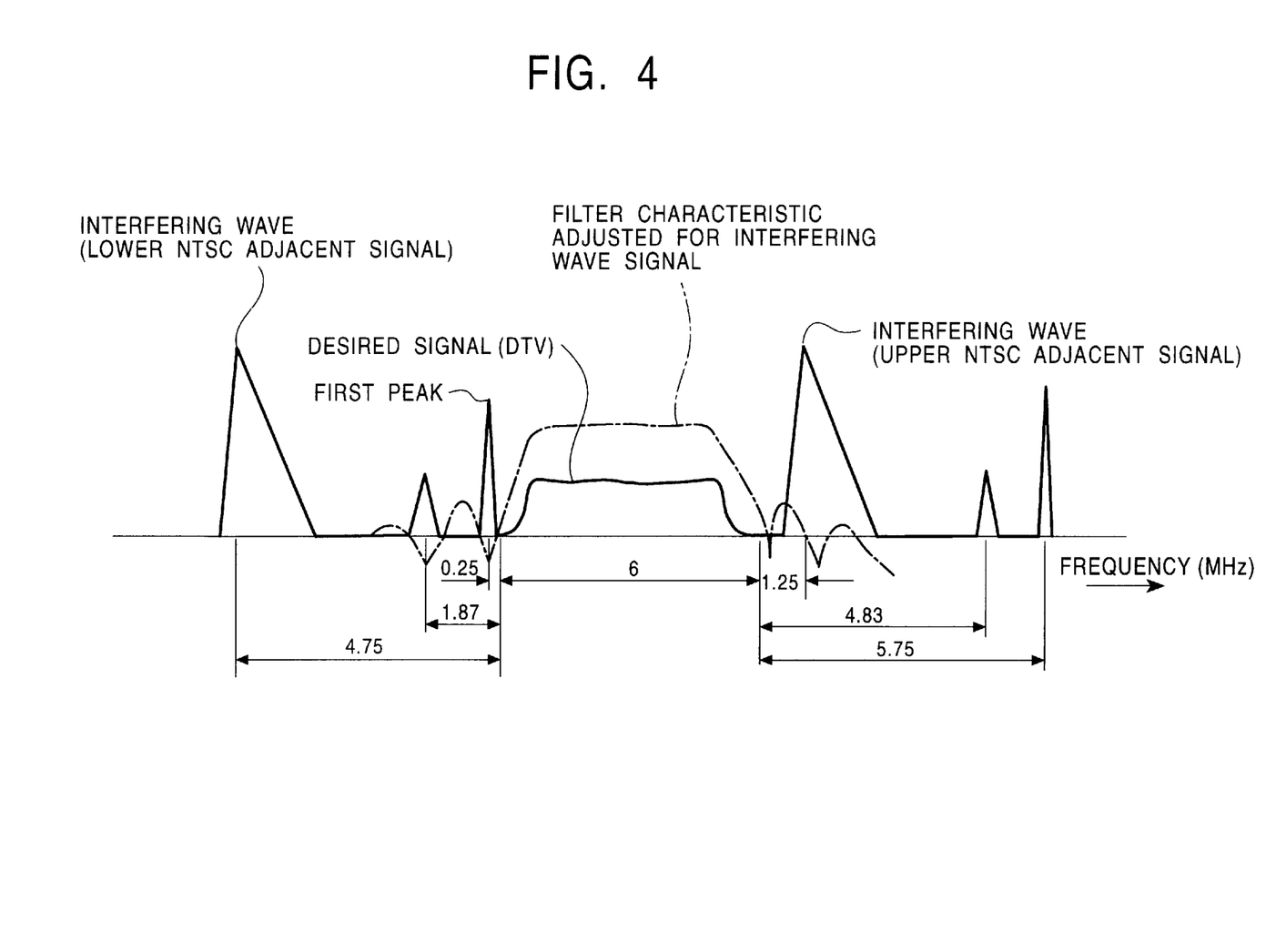
FIG. 4 is a graph showing a filter characteristic of a SAW filter 23 shown in FIG. 2.

As shown in FIG. 4, the SAW filter 23 is a bandpass filter having a comb-shaped attenuation characteristic. However, since the spectrum of the interfering wave is known, the filter is designed in such a manner that the first peak of attenuation-coincides with the frequency at the peak of an interfering wave (a lower adjacent sound signal) which is 0.25 MHz lower than a video signal element. In addition, the intermediate-frequency amplifier 24 is arranged for amplifying the input intermediate-frequency signal based on an AGC feedback signal.

An A/D converter 25 converts an intermediate-frequency signal which is an analog signal into a digital signal to output to a matched filter 26, while it produces an AGC feedback signal to output to the high-frequency amplifier 21, the intermediate-frequency amplifier 24, and an operation unit 29, respectively. The matched filter 26, which is a roll-off filter, is arranged for shaping a waveform of the input digital signal to output to a demodulation unit 27.

The demodulation unit 27 is arranged for performing the VSB-demodulation of the input signal to output to a waveform equalization unit 28. The waveform equalization unit 28 eliminates a ghost image generated due to multipath interference from the input signal by using a learning equalization, a blind equalization, etc., to output to an error correction unit 30, while it outputs the filter tap coefficient value used for equalization (a coefficient information for equalization) to the operation unit 29. The greater the occurrence of ghost images, the larger the filter tap coefficient value.

The error correction unit 30 corrects an error of the input signal by using a Read-Solomon code and a Trellis code to output as a Transport Stream (TS) signal to a demultiplexer 3, while it outputs the respective numbers of effective elements and error elements of the input signal to the operation unit 29.

The operation unit 29 calculates the strength (an antenna level) of a signal which is input into the antenna 1 from an AGC feedback signal input from an A/D converter 25; a multipath value (a value which indicates the degree of multipath interference) by using a filter tap coefficient value input from the waveform equalization unit 28; and, furthermore, a C/N ratio by using the error-rate information (the numbers of effective and error elements of a signal) which is input from the error correction unit 30 so as to output the respective results to a display control unit 31.

Figure 5:
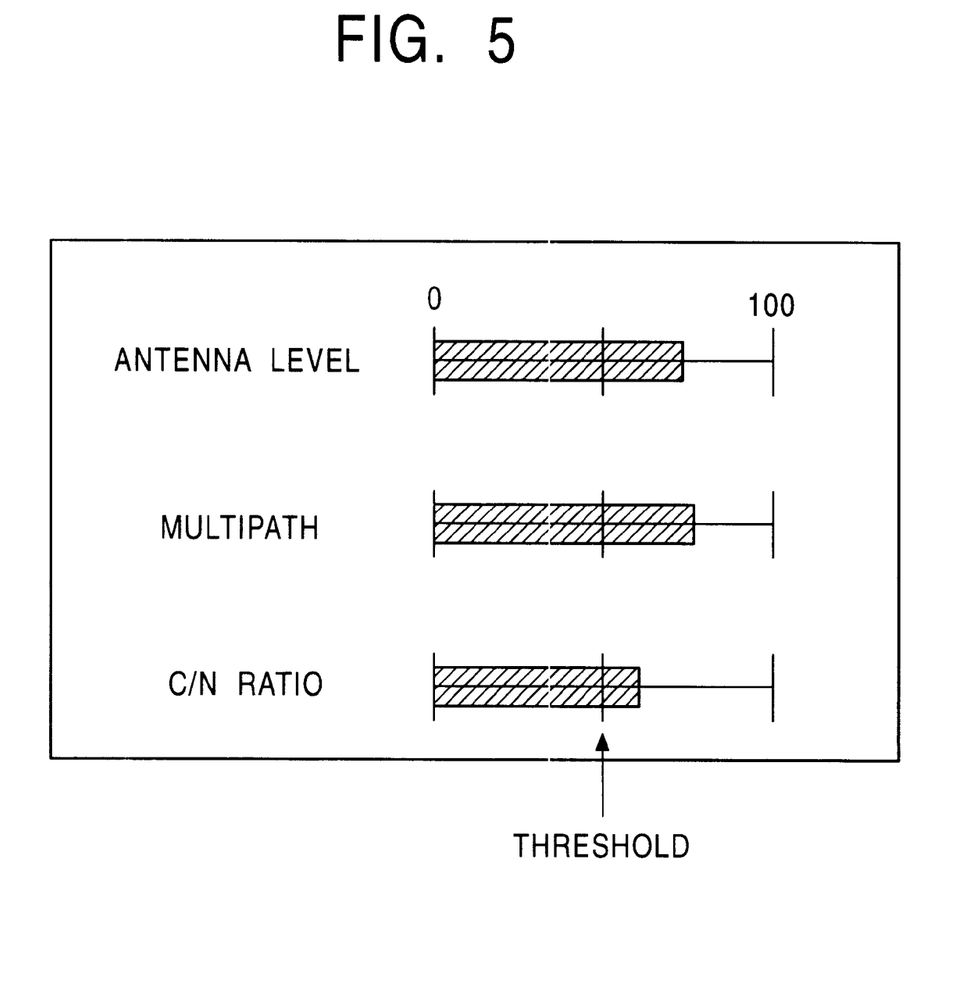
FIG. 5 is a graph showing a receipt status.

Based on the calculation result input from the operation 29, the display control unit 31 produces a picture signal showing a receipt status as shown in FIG. 5 to output to a display 7.

A demultiplexer 3 divides a TS signal input from the demodulator 2 into a video signal and an audio signal; and outputs the video signal to a video decoder 4, while it outputs the audio signal to an audio decoder 6.

The video decoder 4 decodes the input video signal to output to a display processor 5. The display processor 5 is arranged for producing a picture signal from the input video signal to output to the display 7, which is arranged for displaying a picture based on the input picture signal.

The audio decoder 6 decodes the input audio signal to output to a speaker (not shown).

Figure 6:
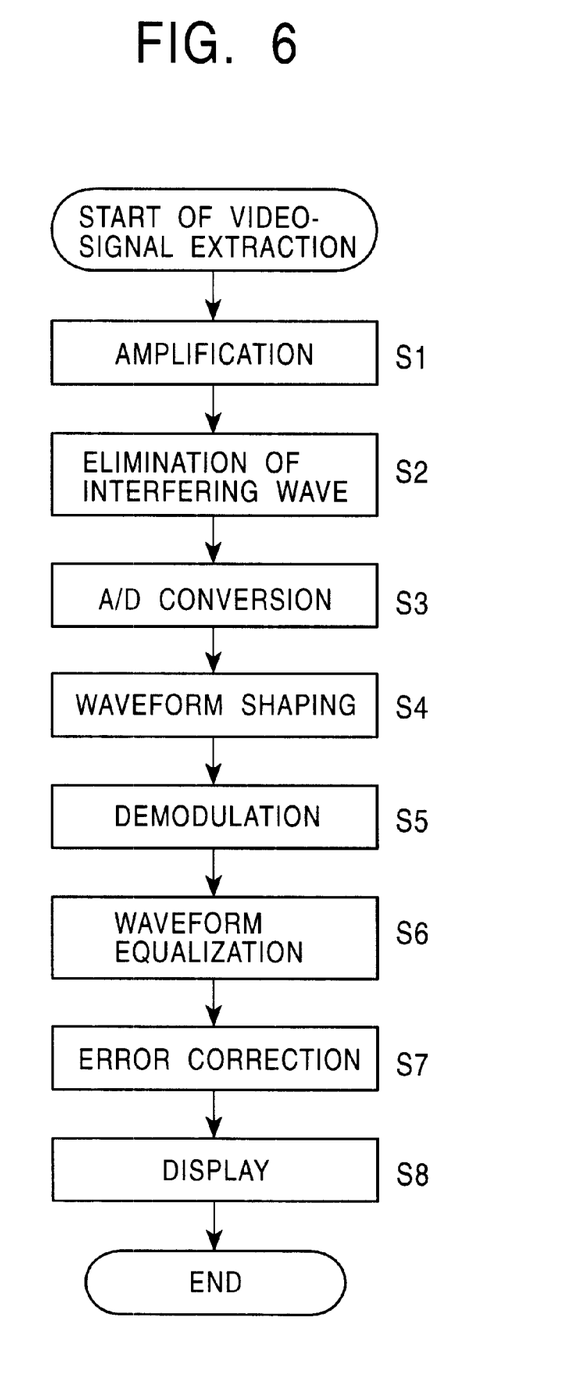
FIG. 6 is a flowchart illustrating a process of video-signal extraction of the device for receiving the ground digital broadcasting.

Next, a description will be given of a video signal extraction procedure of the device for receiving the ground digital broadcasting, referring to a flowchart shown in FIG. 6.

In step S1, an antenna 1 receives a signal transmitted from a broadcasting station by the VSB transmission method as a high-frequency signal (an analog signal) to output to the demodulator 2. A high-frequency amplifier 21 of the demodulator 2 amplifies the high-frequency signal input from the antenna 1 to output to a frequency converter 22, which converts the input high-frequency signal into a signal of an intermediate-frequency (44 MHz) to output to a SAW filter 23.

In step S2, the SAW filter 23 eliminates an interfering wave and extracts a specified channel element (6 MHz bandwidth), which is designated by a user, from the input intermediate-frequency signal to output to an A/D converter 25 via an intermediate-frequency amplifier 24.

In step S3, the A/D converter 25 converts an intermediate-frequency signal, which is an analog signal, into a digital signal to output to a matched filter 26.

In step S4, the matched filter 26 shapes a waveform of the input digital signal to output to a demodulation unit 27, which performs VSB-demodulation of the input signal to output to the waveform equalization unit 28.

In step S6, the waveform equalization unit 28 eliminates ghost images generated due to multipath interference from the input signal to output to the error correction unit 30.

In step S7, the error correction unit 30 corrects an error of the input signal by using a Read-Solomon code and a Trellis code to output as a TS signal to the demultiplexer 3.

In step S8, the demultiplexer 3 divides the input TS signal into a video signal and an audio signal, and outputs the video signal to the video decoder 4, while it outputs the audio signal to the audio decoder 6. The video decoder 4 decodes the input video signal to output to the display processor 5, which produces a picture signal from the input video signal to output to the display 7, which displays the picture based on the input picture signal. The audio decoder 6 demodulates the input audio signal to output to the speaker.

Figure 7:
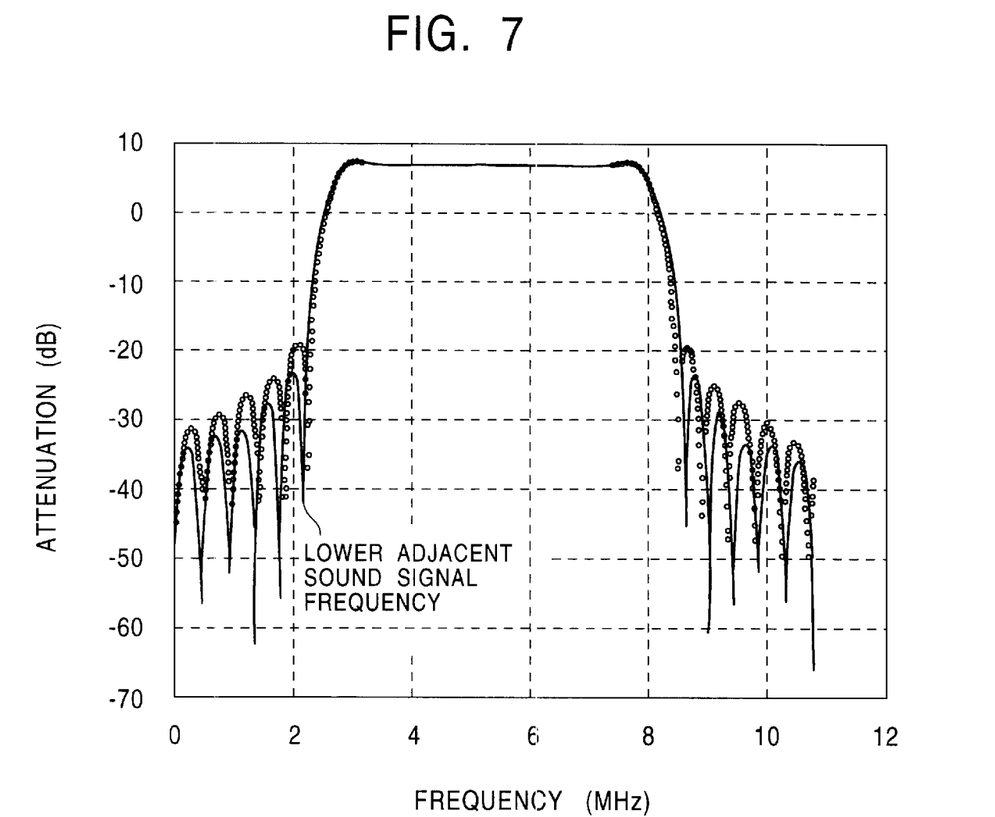
FIG. 7 is a graph showing a filter characteristic obtained when the present invention is applied to a matched filter shown in FIG. 3.

Applying the present invention to the matched filter 26 gives a further enhancement to the function of the device for receiving the ground digital broadcasting in eliminating interfering waves. As shown in FIG. 7, an example of a filter characteristic obtained when the present invention is applied to the matched filter 26 is shown by a solid line, while an example of a filter characteristic obtained when the invention is not applied is shown by a round mark. According to the figure, in the frequency of the lower adjacent sound signal, the filter characteristic obtained when the present invention is not applied is approximately −20 dB, while the filter characteristic obtained when the present invention is applied is approximately −40 dB; thus, it is clear that an attenuation characteristic is enhanced in the case in which the present invention is applied.

Figure 8:
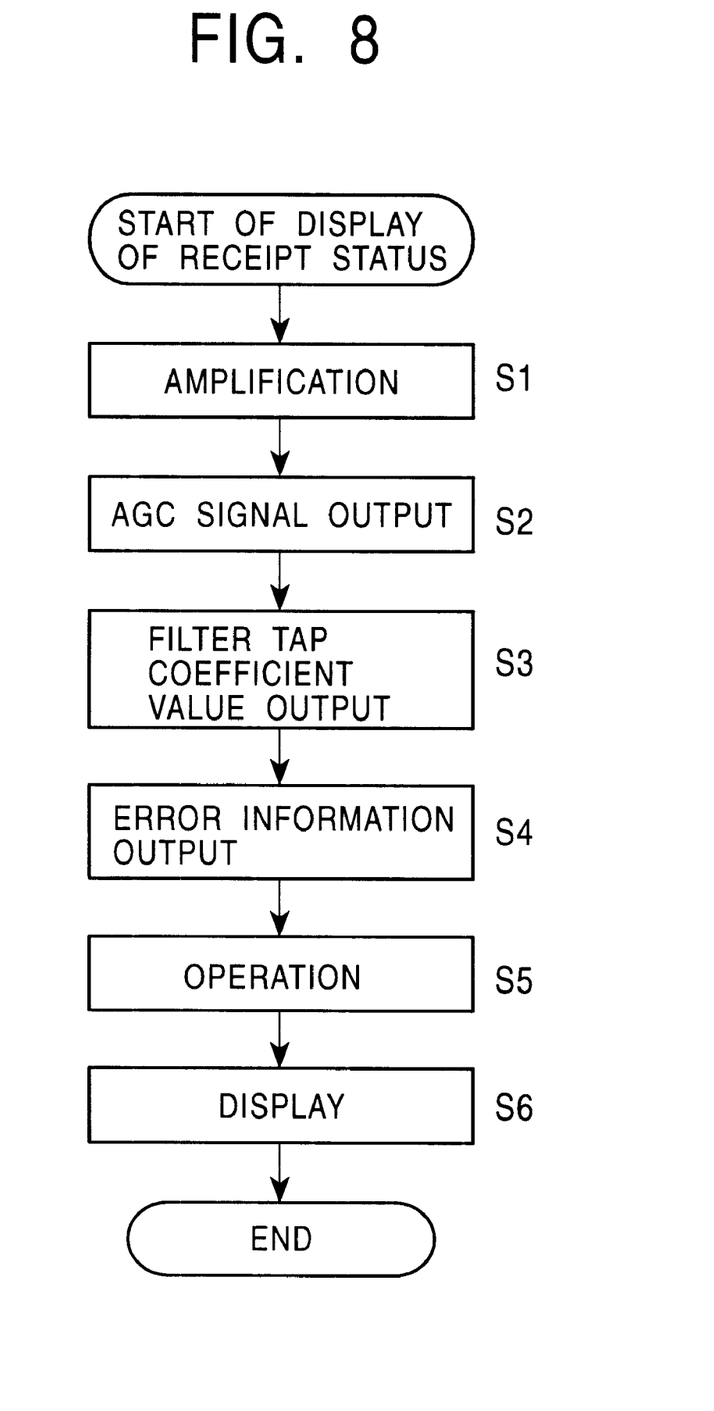
FIG. 8 is a flowchart illustrating a process for displaying receipt status of the ground-digital-broadcasting receiving device.

Referring now to the flowchart of FIG. 8, a description will be given of a receipt-status display procedure of the device for receiving the ground digital broadcasting.

In step S1, the antenna 1 receives a signal transmitted from a broadcasting station by the VSB-transmission method as a high-frequency signal (an analog signal) to output to the demodulator 2; the high-frequency amplifier 21 of the demodulator 2 amplifies the high-frequency signal input from the antenna 1 in correspondence with an AGC feedback signal to output to the frequency converter 22, which converts the input high-frequency signal into a signal of an intermediate-frequency (44 MHz) to output to the SAW filter 23, which extracts a specified channel element (6 MHz bandwidth) designated by a user from the input intermediate-frequency signal to output to the intermediate-frequency amplifier 24; and, then, the amplifier 24 amplifies the input intermediate-frequency signal in correspondence with the AGC feedback signal.

In step S2, the A/D converter 25 converts the intermediate-frequency signal which is an analog signal into a digital signal to output to the demodulation unit 27 via the matched filter 26, while it produces an AGC feedback signal to output to the high-frequency amplifier 21, the intermediate-frequency amplifier 24, and the operation unit 29, respectively; and, then, the demodulation unit 27 performs VSB-demodulation of the input signal to output to the waveform equalization unit 28.

In step S3, the waveform equalization unit 28 eliminates a ghost image generated due to multipath interference from the input signal to output to the error correction unit 30, while it outputs a filter tap coefficient value used for equalization to the operation unit 29. In this case, when the input signal has many ghost images, a learning equalization method is used, while when it has few, a blind equalization method is used.

In step S4, the error correction 30 corrects an error of the input signal by using a Read-Solomon code and a Trellis code to output as a TS signal to the demultiplexer 3, while it outputs the number of error elements of the input signal (error-rate information) to the operation unit 29.

In step S5, the operation unit 29 calculates the strength (antenna level) of the signal input from the AGC signal which is input from the A/D converter 25; a multipath value (a value which indicates the degree of multipath interference) by using a filter tap coefficient value input from the waveform equalization unit 28; and, then, calculates a C/N ratio by using error-rate information (the number of error elements) input from the error correction unit 30 so as to output the respective calculation results and predetermined thresholds to the display control unit 31, which produces a picture indicating a receipt status to output to the display 7 based on the results and thresholds input from the operation unit 29.

In step S6, the display 7 displays the input picture of a diagram indicating receipt status, this diagram being shown in FIG. 5.

Displaying a graph of receipt status (antenna level, multipath, and, C/N ratio) of the ground digital broadcasting can provide the most appropriate orientation for setting an antenna. In the above description, the receipt status is displayed on the display 7. Alternatively, the data to be displayed may be superimposed on a line of an antenna so as to display on a small-sized display unit such as a liquid crystal or LED display, for example.

Furthermore, when repair is required due to poor image or sound quality on the screen of the display 7, referring to the displayed receipt status permits clarification of the cause of the defect: whether it stems from the receipt status of the radio wave or the device. Thus, it is convenient for maintenance.

Moreover, the present invention can be adopted for transmitting information through the ground as a transmission path, for example, in conventional ground analog broadcasting.

As described above, the information receiving device and method according to the present invention permits elimination of an interfering signal with certainty, since the arrangement is such that the peak of the attenuation characteristic obtained when a signal of a specified band is extracted coincides with the peak of the interfering signal. In addition, this invention can determine the most appropriate orientation for an antenna, since the arrangement is such that the multipath value of a signal is calculated to be displayed.

What is claimed is:

1. An information receiving device for receiving an information signal transmitted from a broadcasting station, comprising:

a receiving means for receiving the information signal; and an extracting means for extracting a digital broadcasting signal of a specified band from the information signal received by said receiving means;

wherein the peak of an attenuation characteristic of said extracting means coincides with the peak of an interfering analog audio signal adjacent to said digital broadcasting signal.

2. An information receiving method for receiving an information signal transmitted from a broadcasting station, comprising:

a receiving step for receiving the information signal; and an extracting step for extracting a digital broadcasting signal of a specified band from the information signal received by said receiving step;

wherein the peak of an attenuation characteristic of said extracting step coincides with the peak of an interfering analog audio signal adjacent to said digital broadcasting signal.

3. An information receiving device for receiving an information signal transmitted from a broadcasting station by a ground wave, comprising:

a receiving means for receiving the information signal;

an equalizing means for performing waveform equalization of the information signal received by said receiving means;

an operating means for calculating the strength of a multipath element based on equalization coefficient information used when said equalizing means performs waveform equalization; and a display-controlling means for controlling a display of the strength of the multipath element calculated by said operating means.

4. An information receiving method for receiving an information signal transmitted from a broadcasting station by a ground wave, comprising:

a receiving step for receiving the information signal;

an equalization step for performing waveform equalization of the information signal received by said receiving step;

an operating step for calculating the strength of a multipath element based on equalization coefficient information used when said equalization step performs waveform equalization; and a display-controlling step for controlling a display of the strength of the multipath element calculated by said operating step.

5. A device for receiving an information signal transmitted from a broadcasting station, comprising:

a receiving unit operable to receive the information signal; and an extracting unit operable to extract a digital broadcasting signal of a specified band from the received information signal;

wherein the peak of an attenuation characteristic of said extracting unit coincides with the peak of an interfering analog audio signal adjacent to said digital broadcasting signal.

6. A method for receiving an information signal transmitted from a broadcasting station, comprising:

receiving the information signal; and extracting a digital broadcasting signal of a specified band from the received information signal;

wherein the peak of an attenuation characteristic of the extracting step coincides with the peak of an interfering analog audio signal adjacent to the digital broadcasting signal.

7. A device for receiving an information signal transmitted from a broadcasting station by a ground wave, comprising:

a receiving unit operable to receive the information signal;

an equalizing unit operable to perform waveform equalization of the received information signal;

an operating unit operable to calculate the strength of a multipath element based on equalization coefficient information used when the equalizing unit performs waveform equalization; and a display control unit operable to control a display of the strength of the multipath element.

8. A method for receiving an information signal transmitted from a broadcasting station by a ground wave, comprising:

receiving the information signal;

performing waveform equalization of the received information signal;

calculating the strength of a multipath element based on equalization coefficient information used when the equalization step performs waveform equalization; and controlling a display of the strength of the multipath element.

* * * * *

UNITED STATES PATENT AND TRADEMARK OFFICE
CERTIFICATE OF CORRECTION

PATENT NO. : 6,542,561 B1
DATED : April 1, 2003
INVENTOR(S) : Shigeto Yanagi

It is certified that error appears in the above-identified patent and that said Letters Patent is hereby corrected as shown below:

<u>Title page,</u>
Item [74], insert -- *Attorney, Agent or Firm* – Lerner, David, Littenberg, Krumholz & Mentlik, LLP --.

<u>Column 4,</u>
Line 3, delete "attenuation-coincides" insert -- attenuation coincides --.

Signed and Sealed this

Ninth Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,542,561 B1
DATED         : April 1, 2003
INVENTOR(S)   : Shigeto Yanagi It is certified that error appears in the above-identified patent and that said Letters Patent is hereby corrected as shown below:

<u>Column 1,</u>
Lines 20-21, delete "can be achieved to be expanded" and insert -- may be achievable --.

Signed and Sealed this

Thirtieth Day of September, 2003

JAMES E. ROGAN
*Director of the United States Patent and Trademark Office*